Dec. 10, 1968   E. A. VOSIKA   3,415,368
CORE HANDLING DEVICE WITH AIR SORTING SYSTEM
Filed Sept. 13, 1966   5 Sheets-Sheet 1

FIG. 1

INVENTOR.
EUGENE A. VOSIKA
BY
Dugger Peterson Johnson & Westman
ATTORNEYS

Dec. 10, 1968    E. A. VOSIKA    3,415,368
CORE HANDLING DEVICE WITH AIR SORTING SYSTEM
Filed Sept. 13, 1966    5 Sheets-Sheet 2

INVENTOR.
EUGENE A. VOSIKA
BY
Dugger Peterson Johnson & Westman
ATTORNEYS

United States Patent Office 3,415,368
Patented Dec. 10, 1968

3,415,368
CORE HANDLING DEVICE WITH AIR SORTING SYSTEM
Eugene A. Vosika, New Brighton, Minn., assignor to The Ramsey Engineering Company, St. Paul, Minn., a corporation of Minnesota
Filed Sept. 13, 1966, Ser. No. 579,018
12 Claims. (Cl. 209—73)

ABSTRACT OF THE DISCLOSURE

A testing and handling device for magnetic cores including a testing station in which each of the cores is tested, and is either accepted or rejected in accordance with predetermined standards. After the core has passed through the testing station, it is directed either into an accept or a reject passageway. The passageways use jet aspirating means comprising symmetrical nozzles around a tubular member which causes cores to be pulled into the correct station, either accept or reject, and handles the delicate cores without damage to them. The accept passageway comprises a lateral passageway having an upwardly extending portion so that accepted cores have to be moved out of the path of their gravity fall from the testing station.

---

The present invention has relation to devices for handling and testing magnetic cores and more particularly to a device which utilizes unique controls for increasing the speed of core handling and also has an air sorting system which minimizes chipping and breakage and makes high speed operation possible.

Prior art

At the present time, there are many different devices for handling magnetic cores which are used primarily in computer operations and for testing these cores to make sure that they have the proper characteristics prior to installation in the computer. One of the basic tasks, of course, is to obtain high speed handling without damaging the cores. Prior to this time, there have been various devices advanced which provided tests for checking the cores and then moved the cores into an accept station or a reject station.

Air handling devices of cores have been advanced, but these had severe limitations primarily because the cores could be thrown against the sides of the conduit, chipping and breaking them after the cores had been tested. Of course, if the core is damaged after it has been tested, it will cause trouble in the computer system. Damage after test is intolerable.

The present device

The present invention relates to a core handler that uses a unique sequence of operation to obtain very high speed testing, on the order of 1000 cores per minute, and has an air sorting system for tested cores which includes an aspirator system having a laminar air flow that will center the core in the core discharge tubes to prevent the cores from being chipped.

A probe is inserted through each core for testing and after test, the probe is withdrawn and the cores released in sequence with a core release lever.

The test probe and core release lever are cam operated from a common drive shaft so that they are always properly timed and are made so that they move in planes at 90° to each other. The air sorting device is actuated in response to a proper signal from the test probe or station and is correctly timed through the use of a timing disc driven by the same shaft that drives the cams for the test probe and release lever. The common drive insures that the operation is properly timed and that an accepted core will be released to the sorting mechanism and will be properly sorted.

The aspirators are made so that air enters evenly at a plurality of ports spaced around the periphery of the tube. Thus the air under pressure is directed from all sides of the core carrier tube and this causes a laminar flow of air through the tube. When a core is pulled into the accept tube because of the lower air pressure at its entrance, the core will be moving toward the jets in the aspirator section. When the core comes into contact with the jets of air there will be air pressure acting on all sides of the core. This will prevent the core from being thrown against one wall or side of the accept tube and will therefore prevent chipping. When only a single air entry port is used in an aspirator, the air pressure will throw a core passing the port against the opposite side of the aspirator tube and cause chipping and other damage to the core. The present device prevents this because of the balanced air flow around the periphery of the tube and consequently balanced air pressure around the core. This is termed a laminar flow in the present invention to distinguish from the single point of entry of air in the conventional aspirator. Toroidal cores are shown and discussed herein, but the device will work on cores having other shapes.

Objects of the invention

It is therefore an object of the present invention to present a testing and handling machine for magnetic cores which will permit exceptionally high speed operation.

It is a further object of the present invention to present a core handling device which utilizes a testing probe in combination with a lever that will hold the tested cores in position and release them at the proper time so that they will fall either into the accept or rejection station in response to test signals.

It is another object of the present invention to provide for downward movement of rejected cores from the test station, and lateral slightly upward movement of accepted cores from the test station.

It is a further object of the present invention to provide for a chute in which the cores are held by a release lever and through which a probe will extend when testing particular cores, and wherein the probe and the release lever are moved in planes at 90° to each other.

It is another object of the present invention to present a device wherein the cores are held in a chute with a release lever and tested with a probe that passes through the chute and wherein the release lever and the probe are actuated by cam actuators on a single shaft, and wherein the single shaft drives a timing disc to control the sorting and testing operation intervals.

It is another object of the present invention to present a core handling device which uses aspirator means for moving the cores after they have been tested, and wherein the aspirator means has air pressure entering the aspiration tubes at a plurality of ports positioned evenly spaced around the periphery of the aspirator tube.

Other objects are inherent in the specification and will become apparent as the description proceeds.

Figure 1:
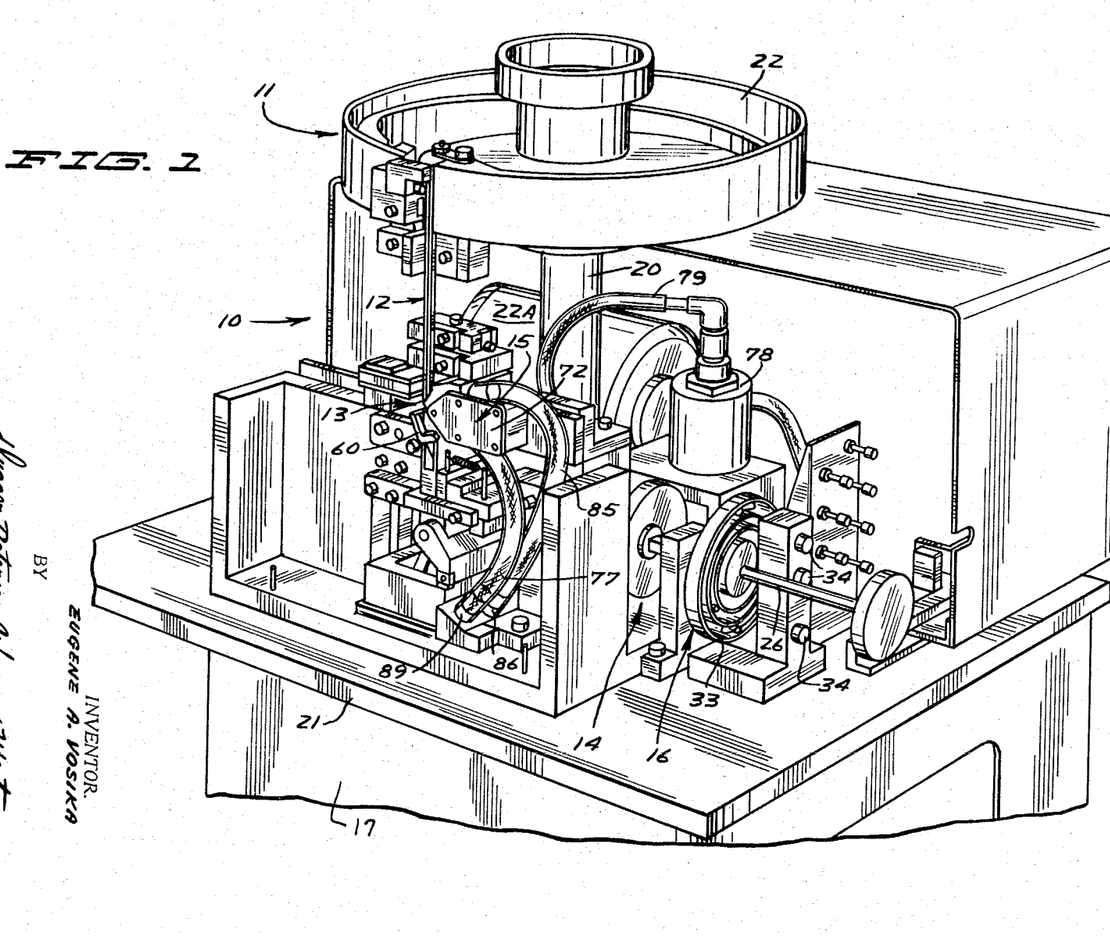
FIG. 1 is a perspective view of the core handling device made according to the present invention.

Referring to the drawings and the numerals of reference thereon, the core handling device is illustrated generally at 10 in FIG. 1. The device consists of several major components including a vibratory feeder-conveyor 11 for the cores, an upright feed chute 12, a testing station 13, a main drive shaft assembly 14, a select aspirator section 15, and a timing assembly 16. The core storage compartments are held within the lower housing 17 of the core handling device.

The feeder 11 is of the vibratory type and is designed to move the toroidal cores into the feed chute 12 so that the cores are properly oriented with their axes extending substantially horizontal, or in other words the axes of the opening of the core is parallel to the test probe. The vibratory feeder 11 is mounted onto a pedestal 20 that is in turn mounted to a table 21 which serves as a frame for the device. The feeder assembly includes a bowl 22 for storing the cores and a suitable vibrator for shaking the bowl to move cores into the chute 12.

*Drive shaft assembly*

Figure 2:
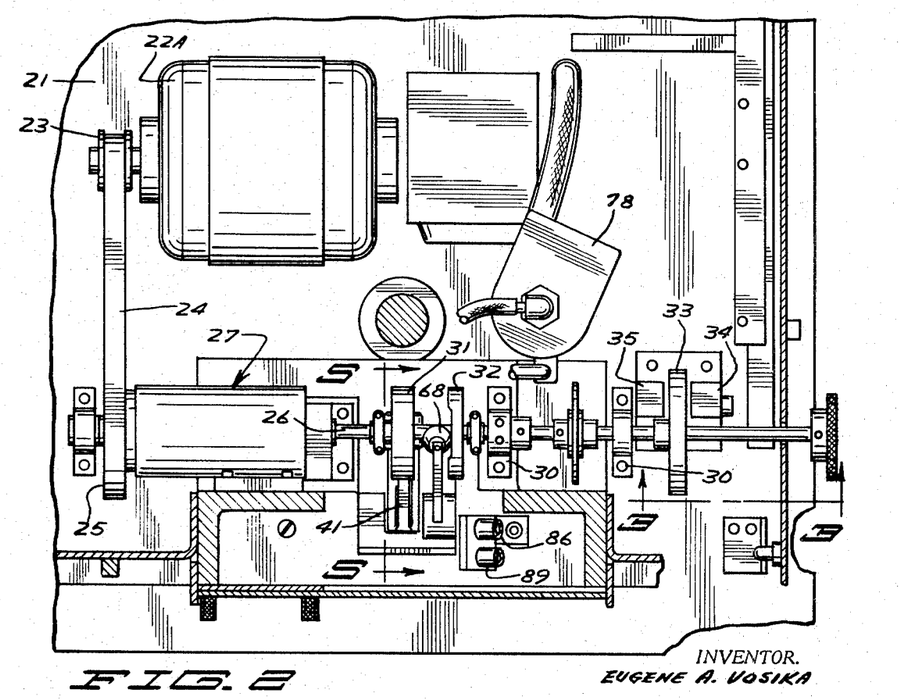
FIG. 2 is a top plan view of the drive shaft and drive motor of the device of FIG. 1 with parts in section and parts broken away.
Figure 3:
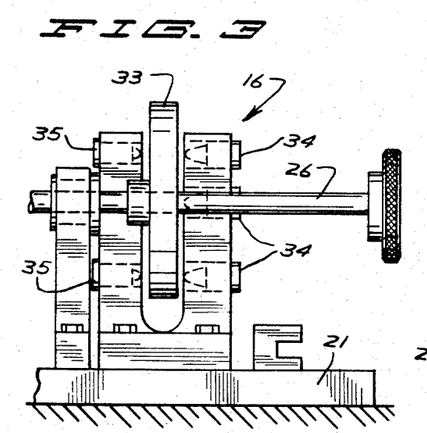
FIG. 3 is a view taken as on line 3—3 in FIG. 2.

Referring specifically to FIG. 2, the table or frame 21 is used to mount an electric motor 22A that has a driven pulley 23 on the output shaft thereof which in turn drives a belt 24 to rotate a pulley 25. The pulley 25 drives a drive shaft 26 through an electro-magnetic clutch and brake assembly 27. The clutch and brake assembly is made so that if the clutch is not energized to drive the shaft 26 the brake is energized to hold the shaft 26 stationary. This is important to avoid errors in timing and guard against stopping the mechanism in the wrong position of the shaft which could cause breakage of the delicate probe or other parts. The clutch and brake assembly is of design available commercially.

The shaft 26 is mounted in suitable bearings 30. A probe cam 31 is drivably mounted onto the shaft and a release lever cam 32 is also drivably mounted onto the shaft. The probe cam is used for driving a testing probe and the release lever cam drives a core release lever. The lobes of the probe cam extend in radial direction from the shaft 26 and the lobes of the release lever cam 33 extend in direction parallel to the axis of the shaft 26. The probe cam and the release lever cam are mounted on the same shaft and are in a predetermined relationship so that they will operate in synchronization with each other.

A timing disc 33 is drivably mounted onto an end portion of the shaft 26. The timing disc, as perhaps can best be seen in FIG. 4 contains a number of slots therethrough. On one side of the timing disc three light sources indicated generally at 34 are mounted, and on the opposite side of the timing disc, aligned with the light sources through the provided slots, photo diodes illustrated generally at 35 are mounted. The photo diodes are used to complete circuits for energization of the various components of the machine.

The machine is designed so that there are two complete test cycles for each revolution of the drive shaft 26. Therefore, the timing disc has two sets of slots. One set of slots controls the timing of one cycle and the other set of slots controls the next cycle. The same is true with the cams 31 and 32. In other words, each of these cams has two operative lobes so that they operate their respective mechanisms twice for each revolution of shaft 26.

Figure 4:
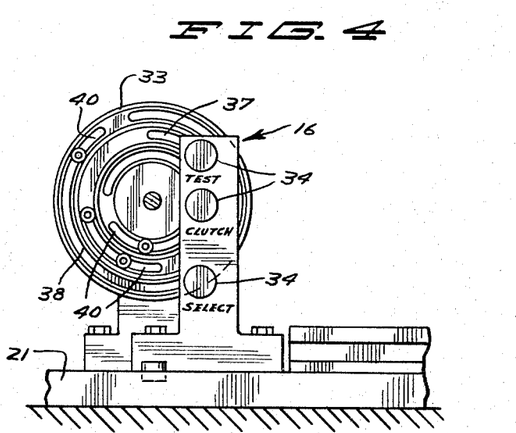
FIG. 4 is a side elevational view of the device of FIG. 3 with parts in section and parts broken away.

The timing disc includes an inner set of slots 36 which are clutch control slots, an intermediate set of slots 37 which are test timing slots and an outer set of slots 38 which are for the "sort" or select timing mechanism.

Adjustable shutters indicated generally at 40 are provided in the slots. The shutters can be adjusted to change the size of opening of the slots so that proper timing can be obtained.

The clutch slot 36 is used merely to insure that the clutch 27 will not be de-energized and the brake locked on until the shaft 26 has rotated to a predetermined position. In other words, the photo diodes aligning with the light source through the clutch slot will lock on the motor 22A. Once the light source is shut off from the aligning diode, then the motor 22A can also be shut off, if some other control in the line indicates that it should be shut off. The clutch slot over controls the on-off switch of the unit. The on-off switch can be thrown to the off position, and the clutch-brake assembly will not be de-energized so that the clutch is released and the brake put in the on position until the timing disc has rotated to position where the light is no longer transmitted through the clutch slot.

The test slot 37 is adjusted so that it will transmit light from its light source 34 to its aligned photo diode 35 only when the "test" procedure is to take place. This, in the particular machine disclosed, is a short interval after the probe has been fully positioned for testing. The test time is controlled by the light passage through the slot 37.

The "sort" or select light slot is used in the circuit for the control of the select section 15 and this will be more fully explained as the select section is described.

*Test probe and core release lever*

Figure 5:
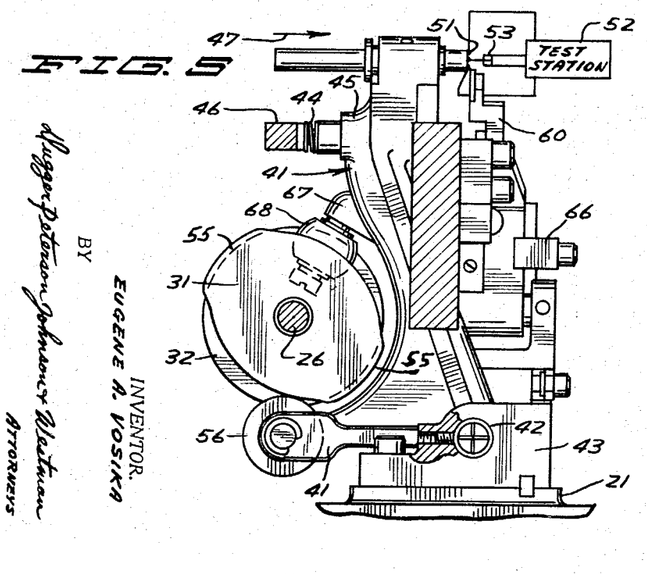
FIG. 5 is an enlarged sectional view taken as on line 5—5 in FIG. 2.
Figure 6:
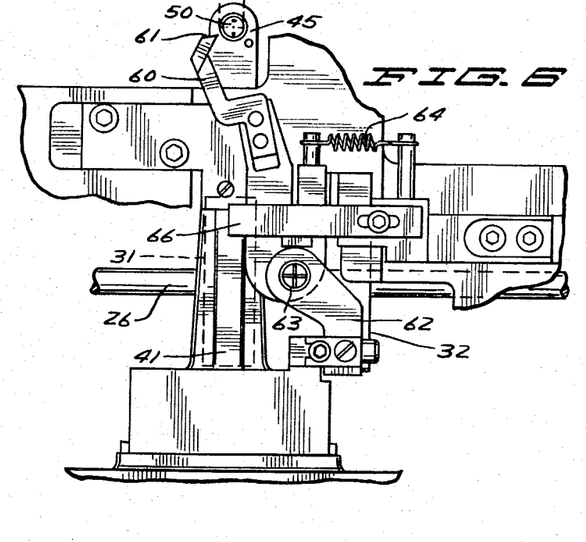
FIG. 6 is a front elevational view of the device of FIG. 5.
Figures 7, 16:
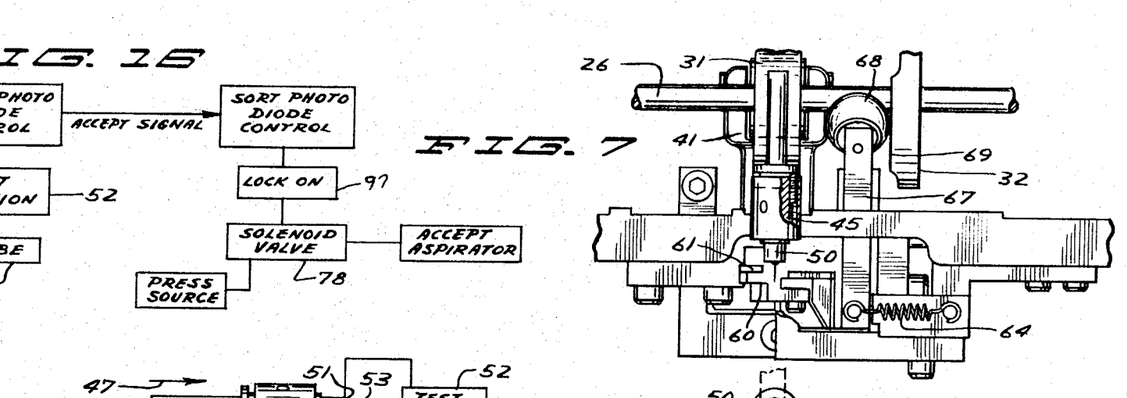
FIG. 7 is a top plan view of the device of FIG. 6.
FIG. 16 is a block diagram showing the interlocking electrical components of the timing mechanism and the test probe.
Figures 8, 10, 11:
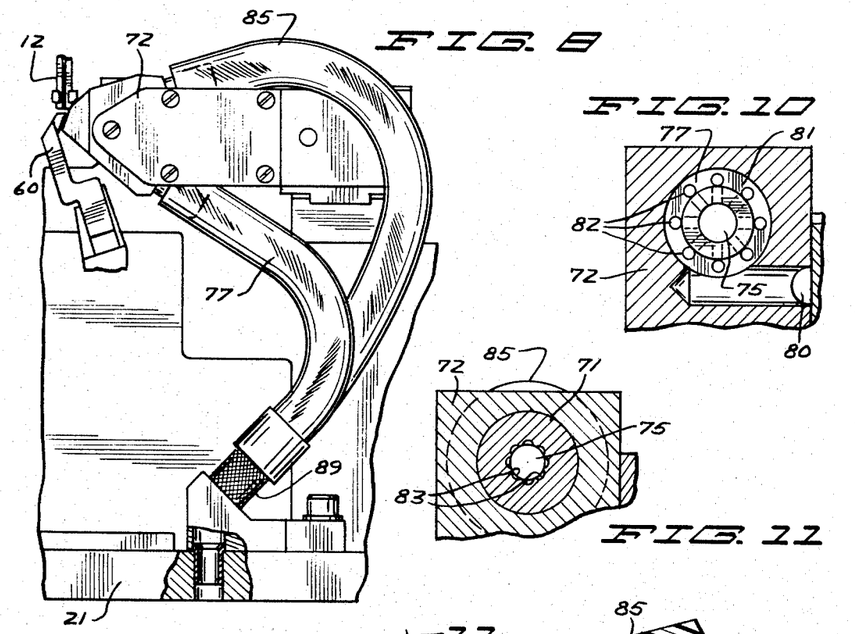
FIG. 8 is a front elevational view of the aspirator assembly used with the core handling device of the present invention.
FIG. 10 is a sectional view taken as on line 10—10 in FIG. 9.
FIG. 11 is a sectional view taken as on line 11—11 in FIG. 9.

Referring to FIGURES 5-7, drive shaft 26 and probe cam 31 are shown. As can be seen in FIG. 5, the probe carrier 41 is pivotally mounted on an axis indicated at 42 to an upright member 43 mounted on the frame or table 21. A spring assembly 44 is mounted between an upright arm 45 of the probe carrier and a stop block 46 that is attached to the frame. The spring assembly 44 urges the probe in direction as indicated by the arrow 47. The probe 50 is mounted on the upright arm 45 and includes electrical contacts 51 that in turn are connected to test circuitry illustrated schematically at 52. When the probe is in its test position as shown in FIG. 5, the outer end of the probe passes through a provided slot in the chute 12 and through the opening in a core in the chute and completes electrical contact through a pair of contacts illustrated schematically at 53 that are mounted in a convenient manner. The contacts 51 also connect through suitable circuitry to the test station.

The lobes 55 of the probe cam act on follower roller 56 of the probe carrier 41 to cause the probe to move in direction opposite that indicated by arrow 47 to withdraw from the chute 12. As can be seen, this will happen twice for every revolution of the shaft 26.

The core release lever is shown at 60. The upper end of the release lever forms a small ledge 61 that moves in a plane 90° from the plane of movement of the probe. The release lever 60 is pivotally mounted to a member 62 of the frame about an axis 63. A spring 64 is used to urge the release lever 60 in direction as indicated by arrow 65. The spring is attached on suitable means on the body of the release lever and on the frame. An adjustable stop illustrated at 66 is provided to prevent the lever from over-traveling during its operation. The release lever 60 has a rearwardly extending projection 67 on lower roller rides against the side surface of the cam 32. The cam 32 has actuating lobes 69 thereon.

When a lobe 69 strikes roller 68 the release lever moves in direction opposite that indicated by arrow 65 to position wherein it clears the bottom of the chute 12. The chute 12 is indicated in dotted lines in FIG. 6. Again, the cam 32 has two lobes 69 thereon so that the release lever is actuated twice each time the shaft 26 rotates.

*Selector assembly*

The selector assembly is shown perhaps in greatest detail in FIGS. 8–11. However, reference will also be made to FIG. 1. The selector assembly is positioned immediately below the delivering chute 12 and adjacent the release lever 60. The selector assembly includes an aspirator housing 72 that has both the select and reject aspirators therein. The aspirator housing has a single opening indicated at 73 in FIG. 9 that is aligned below the opening chute 12. As can be seen, the plane defined by the edges surrounding the opening 73 is placed on the diagonal with respect to the axis of the chute 12 so that cores dropping from the chute 12 will drop under gravity into the opening and yet the lever 60 has clearance. The opening 73 opens into a chamber 74 defined in the aspirator housing and two passageways lead from the chamber 74. A select passageway 75 and a reject passageway 76 are provided. The reject passageway 76 is positioned so that cores that are rejected drop down into the chamber 74 through the opening 73 and will fall under gravity through the passageway 76. The rejected cores are aspirated through the passageway into the reject tube 77 and subsequently deposited in a reject container positioned below the table or frame 21.

Figure 9:
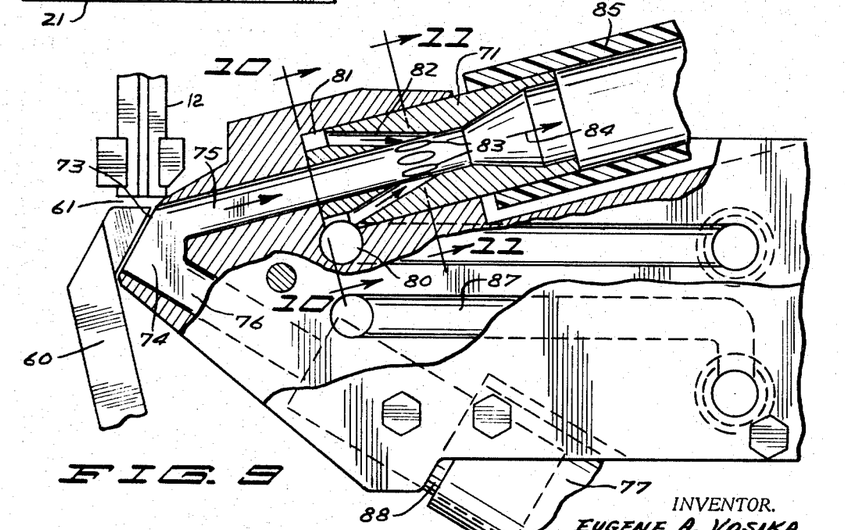
FIG. 9 is a fragmentary part sectional view of the aspirator assembly of FIG. 8.

The reject passageway extends laterally and downwardly from the opening 73. The accept passageway 75 opens into the chamber 74 and extends laterally and slightly upwardly away from this chamber.

The aspirator assemblies for both the reject and the accept passageways are constructed identically. The accept passageway aspirator is shown in section in FIGS. 9, 10 and 11. Assuming that an accept signal has been received from the test station of the device, a solenoid valve 78 is energized, as will be explained subsequently, and the solenoid valve directs air under pressure to the accept aspirator through suitable conduits 79 and an air passageway 80 in the aspirator housing. The air passageway 80 opens into an annular manifold 81 which is provided in each of the aspirators. The manifold 81 is an annular passageway spaced outwardly from the passageway 75. A plurality of jet nozzle passageways 82 are defined in the aspirator section and these open to the manifold 81 and extend at small acute angles with respect to the longitudinal axis of the passageway 75. These jet nozzle passageways open into the passageway 75 through nozzle ports 83 the centers of which lie in a common radial plane normal to the axis of the accept passageway. The jets of air coming from the jet nozzles are moving in downstream direction. The jet nozzles are located evenly spaced around the periphery of the passageway 75 so that air coming in through the passageway 80 enters the manifold 81 and is uniformly directed through each of the nozzles 82 into the select passageway 75. Air will then move in direction as indicated by arrow 84 into an accept tube 85. The air moves through the tube through a decompression wherein it clears the bottom of the chute 12. The screen vents the passageway to atmosphere. The tube 85 opens into a receptacle below the table 21 into which the accepted cores are dropped.

It can thus be seen that jets of air enter the accept passageway (or the reject passageway) evenly so that the air pressure is balanced at the axis of the accept passageway. In other words, air pressure is coming in substantially equal amounts from all directions around the periphery of the tube.

The air moving through either the accept or the reject passageways causes a reduction in pressure at the chamber 74. The air entering the accept passageway will cause any cores dropped from the chute 12 by the release lever to be moved by the air into the accept passageway 75, past the ports 83 and into the tube 85.

The device is made so that when the solenoid 78 is not energized, air is directed under pressure into the passageway 87 which leads to the reject aspirator assembly 88.

It should be noted that the air pressure needed in the reject portion of the aspirator is less than that needed in the accept aspirator and this adjustment can be made through suitable equipment. The reject tube 77 also has a decompression block and screen assembly 89 thereon.

The device therefore normally rejects cores and only when solenoid 78 is energized will it accept cores. Thus, if there is a malfunction of equipment, it is practically assured that no reject core will be accidentally passed into the accept passageway.

*Operation*

Referring to FIGURES 12–15, a sequence of movement between the probe and the release lever in the testing device is shown. The toroidal cores illustrated at 90 are delivered by the feeder 11 into the chute 12. The cores move by gravity in the chute so that the cores rests one on top of the other completely filling the chute. The core axes are parallel to the axis of the needle 91 on the end of the probe assembly 50. As shown, the chute 12, adjacent its lower end has a probe needle guide 92 provided thereon which guides movement of the needle as it moves in and out in direction as indicated by the double arrow 93. The chute 12 has a slot defined in the front end thereof through which the needle will extend when it is in its test position. The release lever 60 moves in a plane at right angles to the plane of movement of the probe 50 and the ledge 61 formed at the upper end of the release lever is made so that when the release lever is in its holding position, the cores dropping through the bottom opening of chute 12 will engage it. When the release lever is in its release position the lever moves so that the cores will not be in contact with the ledge but will be free to drop into the chamber 74 of the selection assembly 15.

Figures 12, 14:
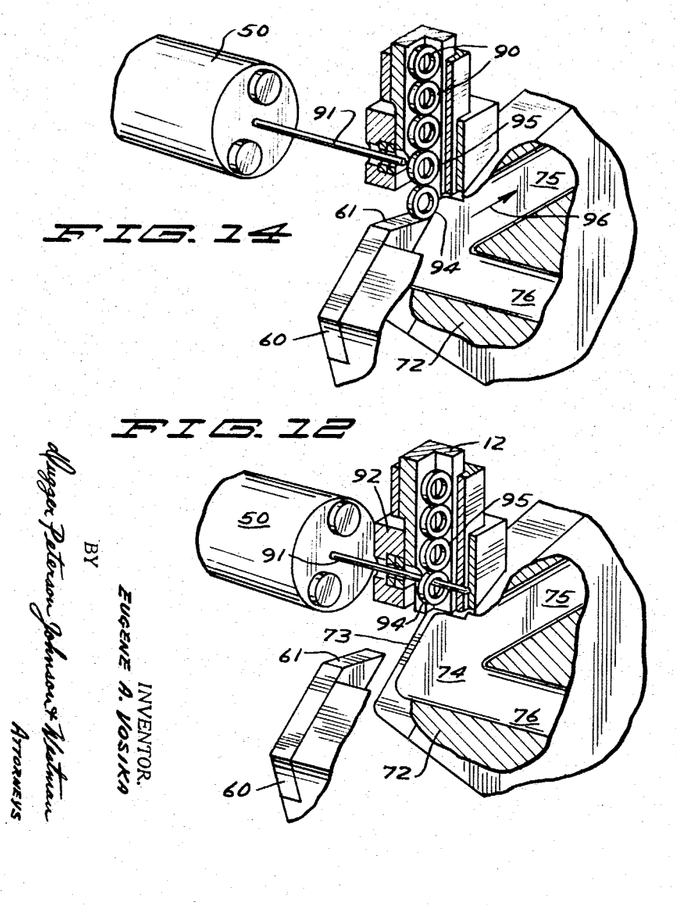
FIGS. 12-15 are perspective schematic views of the core handling device showing a sequence of operation during the testing cycle.

Going through a testing sequence, in FIG. 12 the probe 50 is shown in its forward position. The needle 91 extends through the guide 92 and through the slot in the chute 12 to engage the contacts 53 leading to the test station. After the probe has been fully advanced by the probe cam and the test contact "made," the "test" slot for the photo diode control or timing disc will pass between the test light source and the test photo diode. The circuit to the test equipment is completed and the signals from the test staion will be "read" to see whether the core 94 through which the needle 91 is extending is a core that can be accepted. If the signal from the test station is proper this will complete a circuit through the sort photo diode (which also is energized with the timing disc in this position) and through a "lock on" circuit to solenoid 78. This energizes the solenoid. The solenoid 78 controls a valve to divert air under pressure through the passageways leading to the select aspirator. Air under pressure will thus be flowing through the nozzles 82 and nozzle ports 83. Air flow to the "reject" aspirator will be shut off.

The probe needle holds the stack of cores in place during this phase. The release lever is in "release" position to release a previously tested core.

Figure 13:
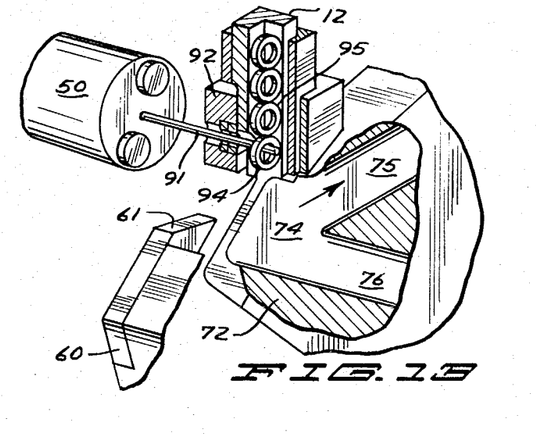

In FIGURE 13, the probe assembly 50 is shown as it withdraws from the test position and the release lever 60 is moving toward its "holding" position. The test signal has been read, and assuming that the core 94 is accepted, the "lock on" circuit to solenoid 78 is holding the solenoid energized through the "sort" photo diode. In FIGURE 14, the unit is shown with the release lever 60 in position underneath the chute 12 and the tested core 94 resting on the ledge 61. The probe needle 91 has been completely withdrawn from the chute 12 to permit all of the cores 90 in the chute to drop down into the next position. It can be seen that with the core 94 resting on the ledge 61, the next following core illustrated at 95 will be aligned with the axis of the needle 91, so that when the probe moves forward for the next test the needle will pass through the opening of the core 95. The conveyor feeder keeps the chute 12 full at all times.

The "lock on" circuit 97 to the solenoid 78 is still energized so that the aspirator for the accept passageway 75 is operating. This means that air is flowing through the accept passageway 75 in direction as indicated by the arrow 96.

Figure 15:
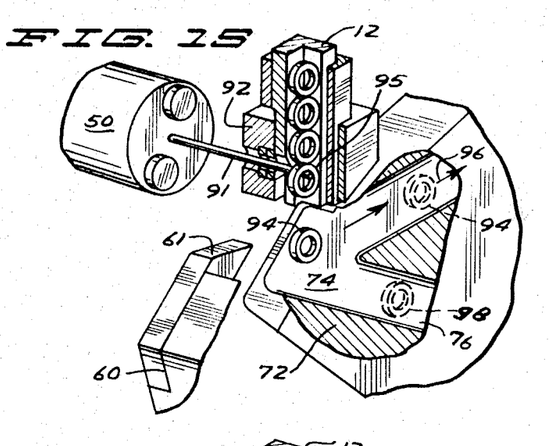

The probe assembly 50 is then actuated by its cam to move forwardly as shown in FIG. 15 with the needle 91 passing through the core 95. The release lever 60 has moved out of the way of the core 94 permitting it to drop through the opening 73 into the select chamber 74 and, because of the air flowing to the accept aspirator section, the core 94 will be moved up into the passageway 75 and will be deposited into the proper receptacle through the accept tube.

The probe will then move to its test position as shown in FIG. 12 and the cycle will be repeated for core 95. Just prior to the time that the "test" diode will again see light through the test slot, the select or sort photo diode will be de-energized because the timing disc will block light from the select light source to the select diode. This will break the circuit leading to the solenoid (see the block diagram in FIG. 16) causing the "lock on" circuit 97 to reset itself. If another accept signal comes from the test station, then the circuit will again lock on so that the solenoid 78 is energized and the proper selection of the newly tested core 95 will be made.

If there is no accept signal coming from the test station, then the solenoid 78 is not energized and the normal air flow will be through the reject aspirator and passageway 76. Then the cores will fall by gravity into the chamber 74 and be moved by the reject aspirator into the passageway 76 as shown in dotted lines 98 in FIG. 15.

The use of a short test cycle controlled by the timing disc insures that the test signal will not be read until the probe is fully seated and all "bounce" is gone from the contacts. A true signal is thus read each time.

The lock on circuit for the accept signal acting through the sort photo control diode insures that the aspirator for the accept tube 75 is operating when the accepted core is released by the lever 60. This lock on circuit will keep the accept solenoid energized until the timing disc interrupts the light sequence. This will not occur until after the probe has reached its contact position as shown in FIG. 12. The circuit will reset itself when the sort diode circuit is broken just prior to the time that the test signal is introduced into the system. The lock on circuit will have been reset at that time to take a new signal.

The movement of the release lever is such that the friction between the cores and the ledge 61 on the release lever is minimized. If there is any frictional contact, the cores will tend to roll slightly rather than hang up on the ledge as the lever moves. This insures that the cores will be dropped through the opening 73 accurately each time the ledge is moved.

The positioning of the accept and reject passageways as shown, makes it easier to get proper movement of the cores into the aspirators. The cores themselves do not have to make a complete reversal of direction from the normal free fall path but merely move laterally outwardly at the time they enter the accept tube. The cores will fall under the force of gravity into the reject tube, although an aspirator is also provided in the reject tube to insure that the cores are properly handled and deposited in the reject chamber. Also, the use of a plurality of nozzle passageways spaced evenly around the periphery of the aspirator section of the accept chamber insures that the air pressure on the cores is equalized to prevent the cores from being bashed against the side of the passageway. This is what happens when a single jet of air is used in an aspirator passageway.

The "testing" circuitry can be of any desired type presently being used. However, the circuitry must give a signal indicating that a core is acceptable.

A rate of 1000 cores per minute can be achieved with the system. The times of operation are therefore very small. For example, the "test" time, or the time during which the test photo diode is energized is about 12 milliseconds.

What is claimed is:

1. In combination with a testing apparatus for magnetic cores, means for conveying said cores from a testing station in said testing apparatus comprising: means defining a passageway having an inlet opening adjacent said testing station and an outlet opening remote from said testing station, said passageway having a cross sectional size larger than the cores, said cores dropping adjacent said inlet opening under gravity after passing through said testing station, jet means for producing a flow of fluid through said passageway from said inlet to said outlet opening sufficient to draw said cores into said passageway under a substantially uniform fluid pressure across the cross section of said passageway, said jet means comprising a plurality of jet nozzles communicating with said passageway in an array therearound with the centers of their respective nozzle openings disposed in a common radial plane normal to the axis of said passageway, said jet nozzles being directed at equal acute angles to the axis of said passageway in direction away from the inlet.

2. The testing apparatus of claim 1 further characterized in that the jet nozzles are positioned in diametrically opposed pairs.

3. Article sorting means for a testing apparatus having means for delivering articles sequentially to a testing station, and for releasing said articles to drop downwardly from said testing station as each test is completed, said sorting means comprising means defining a selection passageway having an inlet opening disposed below said test station and laterally adjacent to the path of fall of said articles, said selection passageway extending laterally and upwardly from its inlet opening, means defining a rejection passageway having an inlet opening disposed below said test station, and in the path of fall of said articles, said rejection passageway extending downwardly from its inlet opening, and means responsive to a signal from said testing apparatus for establishing a flow of air into said selection passageway to thereby deflect selected cores into said selection passageway.

4. Article sorting means in accordance with claim 3 wherein said flow establishing means also maintains a flow of air through said rejection passageway whenever air is not flowing in said selection passageway.

5. Article sorting means in accordance with claim 4 wherein said flow establishing and maintaining means comprises jet means in each of said selection and rejection passageways at a location upstream of the respective inlet openings thereof, said jet means being directed away from said inlet openings.

6. Sorting apparatus for magnetic cores each having an opening therein, comprising: a testing station having a test probe adapted to be extended through and retracted from the opening in a core and signal means to indicate if the core is accepted or rejected, passage means for guiding said cores in a generally upright stack to and through said testing station, movable support means for alternately supporting the entire stack of cores in said passage means when said probe is retracted and for releasing the lowermost core in said stack to fall by gravity when said probe is extended through the aperture in the second lowermost core in the stack, and means for selectively conveying each released core to a select or a reject receptacle, said selective conveying means comprising a select passageway having an inlet opening laterally adjacent the path of every released core, said select passageway having a portion extending generally upwardly from its inlet opening, a reject passageway having an inlet opening in the path of fall of every released core, means normally producing a flow of air through said reject passageway to draw a rejected released core thereinto and means responsive to the signal means for discontinuing said flow in said reject passageway and producing flow in said select passageway to draw an accepted released core thereinto.

7. Sorting apparatus in accordance with claim 6 wherein said flow producing means for said reject and select passageways includes jet aspirating means in each of said passageways near the respective inlets thereof.

8. Sorting apparatus in accordance with claim 7 wherein each of said jet aspirating means comprises means defining a plurality of jet nozzles communicating with a respective one of said passageways in a symmetric array therearound, said jet nozzles being directed at equal acute angles to the axis of said passageway so as to provide a flow pattern which is co-axial with said passageway whereby said articles will not be blown into contact with the walls of said passageway as they pass said nozzles.

9. Sorting apparatus in accordance with claim 8 wherein each of said passageways has an outlet above said select or said reject receptacle and means near each outlet for venting each said passage means to atmosphere.

10. Sorting apparatus in accordance with claim 6 wherein the probe and support means move in planes substantially 90° to each other.

11. The sorting apparatus in accordance with claim 6 and timing means to prevent the signal means from giving an output signal until after the probe is fully extended through a core in the testing station.

12. The sorting apparatus in accordance with claim 6 and timing circuit means to lock on the means for producing flow in the accept passageway until after the core in the testing station has contacted the support means and subsequently been released thereby.

References Cited

UNITED STATES PATENTS

| | | | |
|---|---|---|---|
| 1,943,451 | 1/1934 | Needham | 302—25 |
| 2,858,018 | 10/1958 | Alexander et al. | 209—81 X |
| 3,351,197 | 11/1967 | Smith | 209—74 |

ALLEN N. KNOWLES, *Primary Examiner.*

U.S. Cl. X.R.

209—74, 81; 302—25

UNITED STATES PATENT OFFICE
CERTIFICATE OF CORRECTION

Patent No. 3,415,368

December 10, 1968

Eugene A. Vosika

It is certified that error appears in the above identified patent and that said Letters Patent are hereby corrected as shown below:

Column 5, line 1, cancel "lower" and insert -- which a cam follower roller 68 is mounted. The cam follower --. Column 5, line 65, cancel "tion wherein it clears the bottom of the chute 12." and insert -- sion adapter and screen assembly 86 (see Fig. 1). --.

Signed and sealed this 10th day of March 1970.

(SEAL)
Attest:

Edward M. Fletcher, Jr.
Attesting Officer

WILLIAM E. SCHUYLER, JR.
Commissioner of Patents